July 14, 1953  J. S. SENESKY  2,645,062
GAS PRESSURE REGULATOR

Filed Oct. 18, 1949  2 Sheets-Sheet 1

INVENTOR
JOHN S. SENESKY
BY
ATTORNEYS

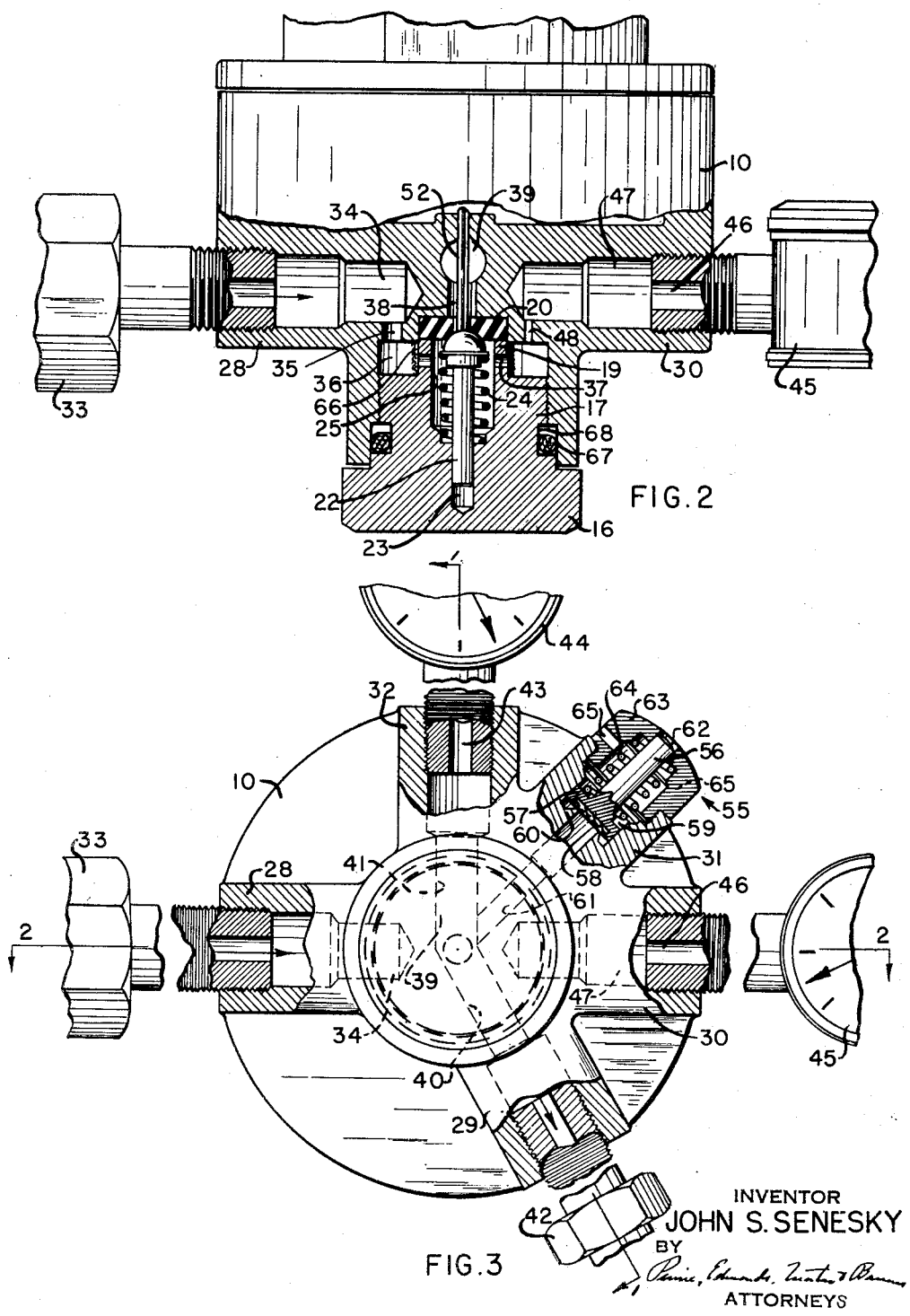

Patented July 14, 1953

2,645,062

UNITED STATES PATENT OFFICE 2,645,062

GAS PRESSURE REGULATOR

John S. Senesky, Somerville, N. J., assignor to Air Reduction Company, Incorporated, New York, N. Y., a corporation of New York Application October 18, 1949, Serial No. 122,113

3 Claims. (Cl. 50—23)

This invention relates to gas pressure regulators of the type in which a diaphragm exposed at one side to the outlet pressure of the gas controls a valve which regulates the flow of gas from the inlet side of the regulator to the outlet side in such a way as to maintain the outlet pressure of the gas at a substantially constant predetermined value.

The principal object of the invention is to provide a gas pressure regulator of this type which is very simple in construction yet highly efficient in operation, and which may be easily and quickly dismantled to permit the valve mechanism to be inspected and repaired.

A gas pressure regulator embodying the invention is illustrated in the accompanying drawings, in which:

Fig. 2 is a partial longitudinal section through the regulator taken approximately on the line 2—2 of Fig. 3; and Fig. 3 is a bottom plan view of the regulator partially broken away in certain places.

Figure 1:
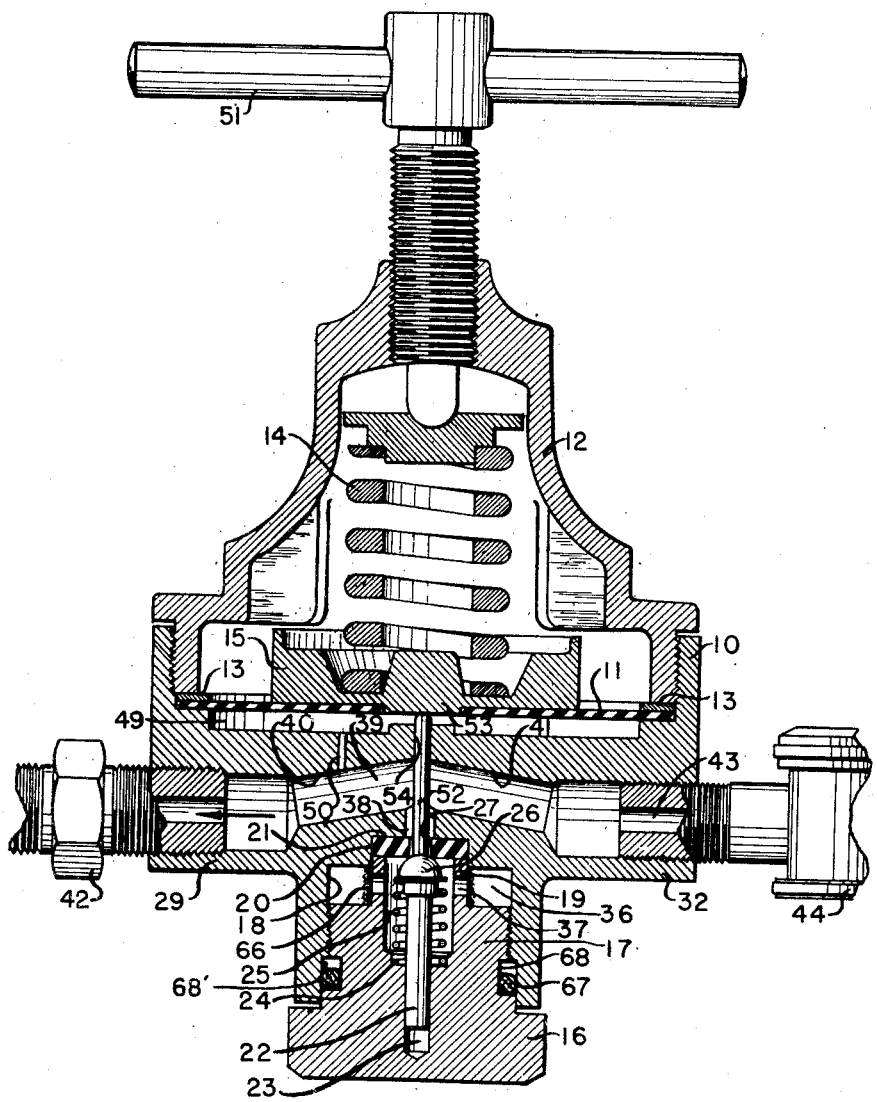
Figure 1 is a longitudinal section through the pressure regulator taken approximately along the line 1—1 of Fig. 3.

The pressure regulator shown in the drawings has a body portion 10, a diaphragm 11 (Fig. 1) preferably made of rubber, and a bonnet 12 which screws into the body 10 and clamps the diaphragm. The diaphragm 11 has a ring 13 bonded to its periphery which maintains the shape of the diaphragm and insures that it is gripped entirely around its circumference by the bonnet 12. A coil spring 14 within the bonnet bears against a diaphragm plate 15 that is bonded to the diaphragm 11 at its center portion. The plate 15 is of such size that only a relatively small annular region of the diaphragm is left without a backing, and this portion of the diaphragm is adapted to flex and thereby permit movement of the diaphragm.

The valve mechanism of the pressure regulator is contained in a cap 16 having an externally threaded plug portion 17 which is received by an internally threaded recess 18 in the underside of the regulator body. The plug portion of the cap 16 has an inwardly projecting annular extension 19 which is adapted to bear against the periphery of a removable valve seat disc 20 and compress it against a shoulder 21 in the bottom of the recess 18. The valve seat disc 20 may be made of hard rubber composition or any other suitable material. A valve stem 22 is guided in a drilling 23 in the cap 16, and is urged axially upward by means of a coil spring 24 contained in a chamber 25 formed in the cap within the annular extension 19. The spring 24 bears against the underside of an enlarged portion 26 of the valve stem which constitutes the movable valve element proper. This valve element has a substantially spherical surface convexed toward a central opening 27 in the valve seat disc 20 and adapted to close this opening when the valve element is pressed against the seat disc by the pressure of the spring 24.

The body portion of the regulator has bosses 28, 29, 30, 31, and 32 on its underside (Fig. 3). The boss 28 receives an inlet connection 33. Gas admitted through this inlet connection is conducted through a passage 34 and thence a drilling 35 (Fig. 2) to an annular chamber 36 which is formed in the recess 18 when the cap 16 is in place. Radial drillings 37 (Figs. 1 and 2) in the annular extension 20 on the cap admit the gas to the chamber 25. The central opening 27 in the valve seat disc registers with a passage 38 and meters the gas released from the high pressure chamber 25 which then flows through the passage 38 to a chamber 39 formed by intersecting drillings 40 and 41 (Figs. 1 and 3) in the bosses 29 and 32, respectively. The passage 40 leads to an outlet connection 42 (Figs. 1 and 3) through which gas may be withdrawn from the regulator as desired. The passage 41 communicates with an opening 43 in the stem of a pressure gauge 44 which indicates the pressure of the gas delivered by the regulator. The gas inlet pressure is indicated by a gauge 45 (Figs. 2 and 3) the stem of which has an opening 46 which communicates with a passage 47 and a drilling 48 (Fig. 2) leading to the annular chamber 36 which contains high pressure inlet gas.

The low pressure gas in chamber 39 has access to a chamber 49 under the diaphragm 11 through a drilling 50 (Fig. 1). The underside of the diaphragm is therefore exposed to the delivery pressure of the regulator. The gas pressure on the underside of the diaphragm acts in opposition to the coil spring 14 whose loading effect on the diaphragm can be varied by turning a handle 51 in a well known manner.

The valve stem 22 has an extension 52 projecting upwardly beyond the valve element 26, through the central opening 27 in the valve seat disc and through the gas passage 38, into contact with the underside of a boss 53 (Fig. 1) on the diaphragm plate 15. This boss projects through a central opening in the diaphragm. The extension 52 of the valve stem is guided in an opening 54 in the regulator body which is in alignment with the drilling 23 that guides the lower end of the valve stem to thereby maintain the valve element 26 in proper alignment with the valve seat disc 20.

The pressure regulator operates in the usual way to maintain a substantially constant predetermined outlet gas pressure depending upon the adjustment of the loading spring 14. Whenever consumption of gas delivered by the regulator causes a reduction in pressure in the chamber 39 at the outlet side of the regulator, this is felt at the underside of the diaphragm 11 which is then moved downwardly by the loading spring 14. This exerts pressure on the valve stem extension 52 and opens the valve element 26 thus admitting more gas from the high pressure annular chamber 36 to the chamber 39 until enough pressure is built up under the diaphragm to restore it to its normal position and permit the valve element 26 to be closed by its spring 24.

The pressure regulator may be provided with a safety valve denoted in general by the reference numeral 55 (Fig. 3) to prevent overloading the diaphragm 11 with excessive gas pressure. It has a valve stem 56 at the inner end of which there is a piston-like portion 57 provided at its underside with a disc 58 of hard rubber composition or other suitable material constituting a valve element. The piston-like portion 57 of the valve slides in a recess 59 formed in the boss 31 on the regulator body. The valve element 58 cooperates with an annular lip 60 in the bottom of the recess 59. This lip constitutes the valve seat. A cross drilling 61 extends from the chamber 39 at the delivery side of the regulator to the underside of the valve element 58. The upper end of the valve stem 56 is guided in an opening 62 in a cap 63 which is screwed onto the boss 31. A coil spring 64 is coaxial with and surrounds the valve stem 56 and bears at its inner end against the piston-like portion 57 of the valve and at its outer end against the end wall of the cap 63 and thus yieldingly retains the valve element in seated position. Excessive gas pressure in the chamber 39 opens the valve element 58 against the force of the spring 64 and permits gas to escape past the valve element and through exhaust ports 65 in the cap 63 to the atmosphere until the excess pressure in the chamber 39 is relieved. Since the end of the valve stem 56 projects out of the opening 62 in the cap 63 when the safety valve is open this gives a visual warning of the excessive gas pressure on the diaphragm. Such excessive pressure might occur when the gas delivery line is shut off, if there should happen to be leakage of gas past the main valve element 26 of the regulator into the chamber 39. This would cause the gas pressure in the chamber 49 under the diaphragm to continue to build up until relieved either by venting of the gas delivery line or by operation of the safety valve which opens at some predetermined safe pressure.

A screen filter 66 is preferably fitted over the cylindrical extension 19 on the cap 16 to filter the gas before it passes the valve element 26 of the regulator.

A gas tight seal for the cap 16 is provided by an O-ring gasket 67 (Figs. 1 and 2) seated in an annular recess 68 in the cap. When the cap is screwed into the body portion of the regulator the O-ring gasket is compressed between the side walls of this recess and the side walls 68' of the recess which receives the plug portion of the cap thereby creating a gas tight seal which prevents the escape of gas from the regulator past the cap to the atmosphere. The O-ring gasket, thus positioned between parallel cylindrical walls on the regulator body and the cap which move relatively in parallel relation when the cap is screwed in place, is an important feature of the invention because it permits the cap 16 to be screwed on the regulator body far enough for the annular extension 19 on the plug portion of the cap to press the valve seat disc 20 firmly in its recess 21 thereby preventing the flow of gas past the valve seat disc except through its central opening 27. Thus, additional nuts or clamping screws are not needed to retain the valve seat disc in place as in other pressure regulators. It is obvious that if the inward movement of the cap 16 were limited by using a sealing gasket for the cap of the kind usually employed in place of the O-ring gasket 67, the required compression of the valve seat disc 20 by the extension 19 on the plug portion of the cap might not be possible, but the use of the O-ring gasket makes possible not only an effective gas tight seal for the cap itself but also for the valve seat disc.

By removing the cap 16 the valve mechanism of the regulator is made accessible for inspection, cleaning, or repair. The screen filter 66 is also easily accessible for replacement or cleaning when it becomes clogged, since it is carried by a portion of the cap and is removed with the cap when the cap is removed and it is then only necessary to slip the screen on or off the cylindrical extension 19 on the plug portion of the cap. Moreover, the mounting of the screen filter on the cylindrical extension 19 of the cap locates it as close as possible to the valve seat and this is advantageous since any metal burs or other foreign matter that may be present in the regulator body itself upon assembly and not visible to inspection are prevented from passing to the valve seat when the pressure regulator is put in use.

I claim:

1. In a gas pressure regulator having a body portion provided with a gas inlet and a gas outlet, a valve controlling the flow of gas from the inlet to the outlet, and a diaphragm exposed on one side to the outlet gas pressure for controlling said valve, the combination therewith of a removable cap a portion of which has threaded engagement with a portion of the regulator body, a valve stem constituting part of the valve and having one portion which is guided in said cap and a second portion which is guided in the regulator body, a valve seat disc having a central opening controlled by said valve and through which said second portion of the valve stem projects, an annular valve seat positioning member disposed between the valve seat member and the threaded portion of the cap which engages the said valve seat disc adjacent its periphery and presses it against a surface of the regulator body when the cap is screwed in place to thereby effect a fluid tight seal between the valve seat disk and the regulator body, and a gasket providing a gas tight seal for said cap, the regulator body and the cap having parallel cylindrical walls which move relatively in parallel relation when the cap is screwed in place and which form an annular space in which said gasket is located.

2. A gas pressure regulator in accordance with claim 1 in which said annular valve seat positioning member is provided with radial ports to admit gas to its interior for passage through the central opening of the valve seat disc, and means for admitting gas from the regulator inlet to the space surrounding said annular valve seat positioning member.

3. A gas pressure regulator in accordance with claim 1 having a cylindrical screen filter fitted on said annular valve seat positioning member to filter the gas passing through its radial ports.

JOHN S. SENESKY.

References Cited in the file of this patent

UNITED STATES PATENTS

| Number | Name | Date |
|---|---|---|
| 738,608 | Fulton | Sept. 8, 1903 |
| 1,635,875 | Albrecht | July 12, 1927 |
| 1,876,937 | Horne | Sept. 13, 1932 |
| 2,005,445 | Wiedhofft | June 18, 1935 |
| 2,301,031 | Ferguson | Nov. 3, 1942 |
| 2,358,228 | Hoof | Sept. 12, 1944 |
| 2,428,150 | Field | Sept. 30, 1947 |